3,133,044
CONTINUOUS PROCESS FOR POLYMERIZING
BISPHENOLS AND PHOSGENE
Charles F. H. Allen and Wilbert J. Humphlett, Rochester, N.Y., assignors to Eastman Kodak Company, Rochester, N.Y., a corporation of New Jersey
No Drawing. Filed Mar. 16, 1969, Ser. No. 799,436
11 Claims. (Cl. 260—47)

This invention relates to a continuous process for the preparation of linear polymeric polycarbonates of a bisphenol and a carbonic acid.

The preparation of polycarbonates of bisphenols and carbonic acid has been well known in the art and has been described in the literature and a number of patents.

The present invention has, as an object, the preparation of such polycarbonates by means of a simple apparatus which can be readily controlled and produce products having a desired inherent viscosity.

A further object of this invention is to provide a process for preparing a prepolymer which is a low molecular weight linear polycarbonate in a medium whereby it can be stored as a stable product and as long as desired, and subsequently polymerized to form a high molecular weight linear polycarbonate of a desired inherent viscosity.

An additional object is to provide a process for preparing low or high molecular weight polycarbonates without the disadvantages inherent in batch operations.

Other objects will become apparent elsewhere herein.

In accordance with a preferred embodiment of this invention, there is provided a continuous process for preparing a highly polymeric linear polycarbonate of a bisphenol and carbonic acid comprising progressively and simultaneously introducing top materials at a point near the top of at least one vertically disposed packed column having a receiver at the bottom and having as the only top openings means for introducing said top materials at a temperature of from about 5° to about 50° C. at which the inert organic solvent being introduced is a liquid, the said top materials being (1) 1 mole proportion per minute of said bisphenol dissolved in from 2 to 8 times its weight of water containing from about 1.1 to about 1.35 molecular equivalents of a hydroxide selected from the group consisting of sodium and potassium hydroxides per mole of said bisphenol, (2) from 3 to 30 ml. per gram mole of said bisphenol per minute of an inert organic solvent which is a liquid at the temperatures employed and is composed of at least one member of the group consisting of hydrocarbons and halogenated hydrocarbons which are capable of dissolving said polycarbonate as it is formed, (3) from about 1.0 to 1.1 mole proportion of phosgene per minute, said introduced top materials having an average total dwell time from about 20 to about 240 seconds in said column, and progressively and simultaneously introducing a catalyst at a point from about 10–60% of the total distance from the bottom of the column to the point of introducing said top materials, whereby said catalyst has an average catalyst dwell time in said column of from about 15 to 150 seconds, said catalyst being selected from the group consisting of trialkylamines, hydrohalides thereof and mixtures with quaternary ammonium compounds, said alkyl radicals containing from 2 to 20 carbon atoms for each alkyl radical and said ammonium compounds being selected from the group consisting of bases and salts having 4 hydrocarbon radicals selected from the group consisting of aliphatic and aromatic radicals containing from 1 to 20 carbon atoms, and collecting at the bottom of said column a 2-phase mixture containing as the organic phase said inert organic solvent in which is dissolved the polycarbonate having an inherent viscosity as measured in chloroform from 0.5 to 4.0.

In accordance with another embodiment of this invention, there is provided a continuous process for preparing a low molecular weight polymeric polycarbonate of a bisphenol and carbonic acid having an inherent viscosity as measured in chloroform of from at least 0.05 and no more than about 0.3, which process comprises a process as defined in the previous paragraph, except that no catalyst is introduced. In this embodiment, the total length of the column can be somewhat less than when a highly polymeric polycarbonate is being produced (40–90% as long) and a dwell time is employed in the range of from about 20 to about 150 seconds or longer (e.g. 300 seconds or more).

The polycarbonate produced without the catalyst is referred to herein as a prepolymer since it can be subsequently quickly polymerized to form a polycarbonate of inherent viscosity of about 0.5 to about 4.0. In order to accomplish this additional polymerization, it is advantageous to add a catalyst as defined in the previous paragraph for preparing the highly polymeric polycarbonate. This catalyst can be added to the prepolymer with agitation in a solution of the defined inert organic solvent until the desired inherent viscosity is obtained. This can be done with or without the presence of the alkaline aqueous phase.

Examples of the vast number of bisphenols which can be employed in accordance with this invention are set forth in the various patents and in the literature, such as British Patent 772,627, a paper by H. Schnell published in Angewandte Chemie, 68, 633–660, No. 20, October 21, 1956. These bisphenols can be broadly defined as compounds containing from 13 to 40 carbon atoms and having the following general formula:

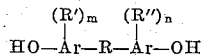

$$HO-Ar-R-Ar-OH \quad (R')_m \ (R'')_n$$

wherein R represents a hydrocarbon radical devoid of olefinic unsaturation containing from 1 to 20 carbon atoms selected from the group consisting of alkylene radicals, alkylidene radicals, and alkyl and aryl substituted alkylene and alkylidene radicals, each Ar represents an aromatic radical of the benzene and naphthalene series containing from 6 to 12 carbon atoms, the hydroxy radicals are attached in a position relative to R other than ortho to R, each of R' and R'' represents a member selected from the group consisting of halogen atoms, hydrogen atoms, alkyl radicals, nitro radicals and alkoxy radicals situated in the available nuclear positions with respect to R and the hydroxy radicals, and each of n and m represents a number of from 1 to 4.

Among the various hydrocarbons and halogenated hydrocarbon solvents that can be employed are chlorobenzene, chloroform, methylene chloride, carbon tetrachloride, trichloroethane, dichloroethane, tetrachloroethane, benzene, toluene, xylene, etc. The important requirements as regards these inert solvents are clearly apparent from the prior art and include the fact that they must be liquids at the temperatures involved in the process and that they be capable of dissolving the polycarbonate which is formed. Those familiar with this art are well aware of the vast variety of such solvents that can be employed including all kinds of mixtures containing various aliphatic and aromatic hydrocarbons and the chlorinated hydrocarbons. One of the most advantageous of these solvents is methylene chloride, although mixtures of methylene chloride with other compounds or various other compounds alone, or in various admixtures, can also be employed. Methylene chloride has been found to be an especially advantageous solvent if the polycarbonate produced is to be left in solution in the methylene chloride until it is roll coated or cast to form a sheet of the polycarbonate. In such roll-coating or casting operations, it is obvious that other solvents or combinations of solvents can be similarly employed.

The packed column in which the polymerization is conducted can be of any desired size depending upon the volume of production and the rate of formation of product which is desired. Ordinarily, the column is of the usual kind containing inert packing material, such as glass helices, Berl saddles, or similar well known packing materials of which a great number are commercially available. The top of the column is closed except for the means of admitting the top materials since it is intended that all of the materials be forced downwardly through the packing material to the receiver at the bottom of the column. The top materials can be introduced as three separate materials as indicated by the numbering of these materials hereinabove. Under some circumstances, the phosgene can be dissolved in the inert organic solvent prior to the introduction into the top of the column. However, there is no particular advantage in doing this and it suffers the disadvantage of requiring a separate operation which adds to the expense of the overall process. If the bisphenol being reacted in the column is 2,2-bis(4-hydroxyphenyl) propane which is commonly known as bisphenol A or BPA, it is advantageous to operate the column at a temperature of about 15–25° C. Other temperatures are more advantageous in some cases where other bisphenols are being reacted. However, the column can ordinarily be operated at ambient temperatures without any strict necessity for cooling. Of course, cooling can be advantageously employed in order to maintain a desired temperature range and allow more rapid operations. Hence, under most circumstances, it is advantageous to put a jacket on the column and keep the temperature below a predetermined level by circulating a suitable heat-exchange medium within the jacket.

As can be seen by the description of the apparatus and process, this invention permits reactions which, in batch equipment, would take a considerably longer period of time, as well as much greater amount of space.

As a practical convenience, it is advantageous to introduce the catalyst into the column or at a point between two columns which are vertically disposed using a solution of the catalyst so as to facilitate its introduction. Such a solution can advantageously comprise 5–50% by weight of catalyst dissolved in inert organic solvent of the type previously described, i.e. methylene chloride.

The catalysts which can be employed include benzyltriethyl ammonium bases and salts, such as the hydroxide, the halides such as the chloride or bromide, tetraethyl ammonium chloride, tetrahexyl ammonium chloride, dilauryldimethyl ammonium bromide, octadecyltrimethyl ammonium chloride, benzyltriethyl ammonium hydroxide, etc. in admixture with a trialkylamine such as triethylamine, triethylamine hydrochloride, triiso-amylamine, octadecyldiethylamine, etc. It is preferred that the catalysts be one or more trialkylamines without any ammonium compound in admixture. It has been found that related compounds which do not accomplish polymerization include trimethylamine, trimethylamine hydrochloride, triphenylamine, pyridine, quinoline, γ-picoline, morpholine, piperidine, etc. Thus, it is apparent that many nitrogenous compounds including triamines which might appear to be efficacious from a consideration of the teachings of the prior art are in fact of no value in the process of this invention. This is quite surprising in view of the teachings of the prior art such as that cited hereinabove. Of course, mixtures of preferred catalysts with such ineffective compounds can be employed.

In practicing the second aspect of this invention, as described above, wherein a prepolymer is obtained, it is important to note that this prepolymer does not require the use of any catalyst in the process. This prepolymer can be collected in the receiver at the bottom of the column, and if desired can be isolated as a solid substance. This solid intermediate or prepolymer can be further polymerized to a high molecular weight polycarbonate by dissolving the prepolymer in an alkaline 2-phase system in accordance with those techniques described in the prior art, wherein a small quantity of a catalyst is used to accomplish the build-up of the molecular weight to whatever inherent viscosity is desired. Alternatively, the prepolymer, as collected at the bottom of the column, can be polymerized directly by adding a catalyst to the medium in which it is present and agitating the mixture until the desired inherent viscosity is obtained. In each of these procedures practically any acid, such as acetic acid, can be added to stop the polymerization at a desired point where the inherent viscosity has attained a desired value.

The prepolymer intermediate is a low molecular weight polycarbonate which has chloroformate end groups and inherent viscosity on the order of about 0.1 (0.05–0.3) as measured in chloroform. Analysis of such a prepolymer by infra-red based on standard substances, indicates a polymeric form; a molecular determination gives a molecular weight of about 5000 when the prepolymer has an inherent viscosity of about 0.1.

When the apparatus of this invention is being used to produce a highly polymeric polycarbonate by introducing the catalyst into the column, the polymeric product, as it is formed, dissolves in the inert organic solvent and is collected at the bottom of the column in a receiver. At this point, all of the phosgene which may have been introduced as a gas has been dissolved and no hazard from the free gas is ordinarily involved at this point. The apparatus produces high molecular weight polycarbonate continuously. The degree of polymerization may be controlled by the rate of the introduction of the top materials. When it is desired to obtain a polycarbonate useful in forming film, it is advantageous that the inherent viscosity be in the range of about 1.0 to about 1.8.

As a result of the practice of this invention in producing highly polymeric polycarbonates, a very uniform product can be obtained without the disadvantages inherent in batch operations. Batch reactions require large floor areas and large-scale equipment with appropriate supervision and require considerable expenditures of time in warming and cooling, charging, discharging, cleaning reactors, etc. Moreover, the human element is more likely to introduce errors in the batch operations, whereas the continuous process of this invention allows runs for prolonged periods of time requiring very little floor space and a minimum of supervision. When compared to a glass-lined batch reactor of equal capacity, the continuous-process apparatus of this invention can be operated relatively inexpensively, since a much greater productivity per man hour can be achieved, as well as for other reasons.

COLUMN REACTOR A

In accordance with one embodiment of this invention, a column was employed having a 2″ inside diameter and 46″ in length, consisting of a glass tube which is water jacketed for cooling. This column was packed with ¼″ Berl saddles. Phosgene from tanks was metered through a calibrated flowmeter and through a glass pipe into the top of the column. A solution of bisphenol in water with caustic was employed and fed through an accurate proportionating pump which delivers a calibrated volume into the top of the column. Methylene chloride was delivered from a reservoir by pump into the top of the column. The receiver was a 5-liter flask with a stopcock at the bottom for withdrawing the product and an outlet which for safety purposes was vented to a hood. This type of apparatus can be used for effecting a preparation of prepolymer in the manner described above.

COLUMN REACTOR B

Another apparatus which can be employed in order to produce the highly polymeric polycarbonate differs from that just described in that the 46″ column has appended vertically beneath it a 20″ glass column, without a water jacket, having a 2″ inside diameter packed with ¼″ Berl saddles. Into the top of this lower extension there was pumped a solution of catalyst by means of an accurate proportionating pump supplied by a reservoir. In most instances, the catalyst was a solution of triethylamine in methylene chloride. The inlet tube for the catalyst is designed to distribute the catalyst solution uniformly onto the packing within the lower column. In this case, a 22-liter receiving flask was joined to the bottom of the lower column as the receiver.

Although various trialkylamines work quite satisfactorily as catalysts when they are liquids, it is advantageous to use solutions to facilitate their introduction. A great number of catalysts within the scope defined hereinabove can be employed. It is especially advantageous that the catalyst is substantially entirely composed of one or more trialkylamines, since such catalyst promotes the reaction many times more rapidly than do quaternary ammonium compounds.

As a result of the practice of this invention in preparing prepolymers, it is possible to produce a stable material in a continuous process which can be stored until needed. This prepolymer can then be taken to the place where the high molecular weight polymer is needed and polymerized and used immediately for roll coating, casting and other purposes. Thus, in large-scale commercial operations the prepolymer can be prepared where the hazards of using phosgene are not likely to affect many persons; then the polymerization of the prepolymer on a commercial scale can be accomplished in a populated area without the further use of phosgene and without hazard to the community.

The following examples will serve to further illustrate the practice of this invention for preparing a prepolymer, using the apparatus described above, employing the 46″ glass column having a 2″ inside diameter.

*Example 1*

Into the top of the column reactor designated A there was constantly pumped 3,465 ml. of a solution consisting of 456 g. (2 moles) of bis(4-hydroxyphenyl)2,2-propane (also called bisphenol A or BPA), 500 g. of 50% sodium hydroxide, and 2800 ml. of water over 60 minutes. During this time, into the top of the column was pumped 4800 ml. of methylene chloride. Simultaneous to the addition of these two liquids, an equivalent amount of phosgene was metered into the top of the reactor column at a rate of 198 g. (2 moles) per hour. The solution obtained at the bottom of the reactor column was collected and the methylene chloride removed under reduced pressure. The resultant white precipitate was collected by suction-filtration and washed with water. The product amounted to 395 g. when dry. After dissolving in chlorobenzene and filtering, addition of petroleum-ether to the solution caused the prepolymer to precipitate; it had a M.P. 198°. A Menzies and Wright molecular weight determination in chlorobenzene indicated a molecular weight of about 5,000. Assay by infrared, based upon a standard polycarbonate, indicated functional groups to be present which are identical to those of a polycarbonate. The inherent viscosity was 0.1 in chloroform, and a sodium fusion of a sample tested positively for presence of chloride ion.

A 2 g. sample of the prepolymer was dissolved in 20 ml. of methylene chloride and 10 ml. of water added. To this stirred, two-phase system were added a few drops of triethylamine. The organic phase quickly became viscous and excess acetic acid was added to end the reaction. After the organic phase was extracted with water five times, acetone was added to precipitate the polycarbonate, which when dry had an inherent viscosity of 2.0 in chloroform.

In this and other examples the solvent can be one or more of the above specified compounds, especially those having from 1 to 10 carbon atoms.

*Example 2*

The procedure described in Example 1 was repeated using column reactor A, but the solution of the effluent from the column was transferred, after it was all collected in the receiver, to a suitable flask and a dilute solution of triethylamine in methylene chloride was added to this prepolymer. While this prepolymeric reaction mixture was being stirred, progress of the further polymerization was determined periodically by the drainage rate of a sample from a standardized pipette. Vigorous stirring so as to form an emulsion produced the most highly polymeric products. When it was desired to terminate the reaction, excess acetic acid was added. The methylene chloride phase was washed by stirring with water and decanting the water-phase five times. Addition of acetone to the methylene chloride solution precipitated the polycarbonate. The inherent viscosity obtained was largely dependent upon the degree of stirring before addition of acetic acid. Results typical of this process are summarized in Table I.

TABLE I

| Prepolymer formation rate, as uniform input for 1 hr. | | Subsequent catalyst soln. | | Ultimate yield | | I.V.[1] |
|---|---|---|---|---|---|---|
| BPA, g. | Methylene chloride, ml. | Ml. | Conc., percent by vol. | Grams | Percent | |
| 456 | 2,040 | 100 | 15 | 469 | 92 | 1.28 |
| 912 | 6,530 | 200 | 20 | 915 | 89 | 1.0 |
| 1,215 | 6,530 | 200 | 20 | ------ | ------ | 1.05 |
| 1,520 | 5,340 | 200 | 30 | 1,480 | 87 | 1.14 |
| 1,520 | 5,340 | 15 | 10 | 1,680 | 98 | [2]1.96 |

[1] In chloroform.
[2] The reaction mixture was stirred into an emulsion before adding acetic acid.

*Example 3*

The general procedure described above was repeated in the two-column reactor designated above as B. A solution of triethylamine was pumped into the polymerization area of the apparatus at the top of the lower column. The polymerized product collected in the receiver was acidified with acetic acid, purified, and isolated as above and is typically illustrated in Table II.

TABLE II

| Rate, input/hr. | | Input of catalyst soln. | | Yield | | Packing size; Berl saddles | I.V. |
|---|---|---|---|---|---|---|---|
| BPA, g. | Methylene chloride, ml. | Rate, ml./hr. | Conc., percent by vol. | g./hr. | Percent | | |
| 456 | 3,120 | 2,040 | 1.5 | 477 | 93 | Inch ½ | 0.80 |

Stirring the effluent before adding acetic acid resulted in products of increased inherent viscosities such as 1.14, 1.59, and 2.08.

This rate of preparation of polycarbonate is seven times greater than that of the usual batch preparation in a vessel of a volume equal to the volume of this reactor column.

*Example 4*

The viscosity of the effluent from the reactor column of Example 3 is dependent upon the particle size of the packing in the polymerization area, i.e., upon the dwelling time in that area. The effect of this variation is shown in Table III. In this study, samples of the effluent were collected in acetic acid at the bottom of the column in order to stop the reaction immediately at this point.

TABLE III

| Rate, input/hr. | | Input of catalyst soln. | | Packing as Berl saddles | I.V. |
|---|---|---|---|---|---|
| BPA, g. | Methylene chloride, ml. | Rate, ml./hr. | Conc., percent by vol. | | |
| 456 | 5,350 | 2,040 | 3 | ½ inch | 1.03 |
| 456 | 5,350 | 2,040 | 3 | ¼ inch | 1.70 |
| 456 | 5,350 | 2,040 | 3 | ¼ inch Berl saddles plus 2 inch top layer of ¼ inch glass helices. | 2.01 |

*Example 5*

The viscosity of the effluent from the reactor column of Example 3 is also dependent upon the rate of input of solvent, increasing amounts of solvent decreasing the dwelling time in the polymerization area. This effect is demonstrated in a series of experiments summarized in Table IV. All samples of effluent were collected in acetic acid at the bottom of the column.

TABLE IV

| Rate, input/hr. | | Input of catalyst soln. | | Packing as Berl saddles | I.V. |
|---|---|---|---|---|---|
| BPA, g. | Methylene chloride, ml. | Rate, ml./hr. | Conc., percent by vol. | Inch | |
| 456 | 3,120 | 2,040 | 3 | ½ | 2.23 |
| 456 | 4,000 | 2,040 | 3 | ½ | 1.26 |
| 456 | 5,350 | 2,040 | 3 | ½ | 1.03 |
| 456 | 6,520 | 2,040 | 3 | ½ | 1.00 |
| 456 | 7,700 | 2,040 | 3 | ½ | 0.40 |

*Example 6*

The viscosity of the effluent from the reactor column of Example 3 is furthermore dependent upon the concentration of the triethylamine solution as indicated in Table V. These samples of effluent were collected in acetic acid as in the preceding example.

TABLE V

| Rate, input/hr. | | Input of catalyst soln. | | Packing as Berl saddles | I.V. |
|---|---|---|---|---|---|
| BPA, g. | Methylene chloride, ml. | Rate, ml./hr. | Conc., percent by vol. | Inch | |
| 456 | 4,000 | 2,040 | 1.5 | ¼ | 0.57 |
| 456 | 4,000 | 2,040 | 3.0 | ¼ | 1.58 |

*Example 7*

At each rate of operation, the minimum amount of solvent required to prevent the column from clogging is dependent upon the size of the packing. This is demonstrated in Table VI.

TABLE VI

| Rate, input/hr. | | Input of catalyst soln. | | Packing | I.V.[1] |
|---|---|---|---|---|---|
| BPA, g. | Methylene chloride, ml. | Rate, ml./hr. | Conc., percent by vol. | | |
| 1,520 | 7,700–11,000 (clogging) | 2,180 | 3 | ¼ inch Berl saddles plus 2 inch top layer of ¼ inch glass helices. | [2] 1.86 |
| 1,520 | 11,000 | 2,180 | 3 | ---do--- | [3] .85 |
| 1,520 | 5,350 | 2,180 | 3 | ½ inch Berl saddles plus 2 inch top layer of ¼ inch glass helices. | [3] 1.0 |

[1] In chloroform.
[2] The effluent was collected in the receiver until the end of the run and then acidified with acetic acid.
[3] The effluent was collected in acetic acid.

The above examples illustrate the use of any of the designated trialkylamines as catalysts. When this apparatus is operating at a rate of one pound input of bisphenol A (BPA) per hour the dwelling time in the reactor B is 80 seconds. Of course less than one pound per hour can be introduced and the maximum dwelling time encountered increased when bisphenols of various slow reacting types are employed. The polymerization area of the lower column of B represents only one-third of the total column length, and the dwelling time in this area is only a fraction of the total of 80 seconds. Any catalyst to be useful must effect polymerization in a brief time such as this. A quaternary ammonium salt such as benzyltriethylammonium chloride, which requires 30 minutes to 2.5 hours to produce a useful viscosity, is therefore of no value in this equipment unless it is mixed with a more active catalyst.

*Example 8*

The preceding examples were repeated using various modifications, catalysts, solvents, concentrations, rates, bisphenols, mixtures of bisphenols, bischlorocarbonates of various organic diols in lieu of all or part of the phosgene, etc. The preferred aspects of such variations are covered by the description of the invention set forth hereinabove and the results obtained were comparable to those outlined in the preceding examples. Especially good results were obtained using tetrachlorobisphenol A and its mixtures with 50–90 mole percent of BPA. This compound can be designated as 2,2-bis(3,5-dichloro-4-hydroxyphenyl) propane. Other especially effective catalysts include tributyl amine and tri-isoamylamine.

In a broad sense this invention can be said to encompass a continuous process for preparing a linear polycarbonate of a bisphenol and carbonic acid comprising progressively and simultaneously introducing these materials into the upper region of a packed column at less than 50° C.: (1) a bisphenol dissolved in water containing an alkaline hydroxide in an amount greater than that theoretically required to form the corresponding bisphenol salt, (2) an inert organic solvent which is a liquid at the temperatures employed and is a solvent for the polycarbonate which is formed, and (3) phosgene in a molecular amount greater than said bisphenol, said materials having a dwell time in said column whereby the effluent from the bottom of the column contains a polycarbonate which has an inherent viscosity measured in chloroform of from 0.05 to 4.0. However, the especially advantageous embodiments are described above, especially as regards the particularly unobvious catalyst features. Among such unobvious features is the fact that the continuous process of this invention operates at an unexpectedly high rate on the order of about 25 times greater than batch preparation in a vessel of a volume equal to that of the column, e.g., see Table VI where reactor B can be operated at a rate of at least 1,520 grams/hr.

The invention has been described in detail with particular reference to preferred embodiments thereof, but it will be understood that variations and modifications can be effected within the spirit and scope of the invention as described hereinabove and as defined in the appended claims.

We claim:

1. A continuous process for preparing a highly polymeric linear polycarbonate of a bisphenol, said bisphenol being devoid of olefinic unsaturation, said process comprising progressively and simultaneously introducing top materials at a point near the top of at least one vertically disposed packed column having a receiver at the bottom and having as the only top openings means for introducing said top materials at a temperature of from about 5° to about 50° C., the said top materials being (1) 1 mole proportion per minute of said bisphenol dissolved in from 2 to 8 times its weight of water containing from about 1.1 to about 1.35 molecular equivalents of a hydroxide selected from the group consisting of sodium and potassium hydroxides per mole of said bisphenol, (2) from 3 to 30 ml. per gram mole of said bisphenol per minute of an inert organic solvent which is a liquid at the temperatures employed and is composed of at least one member of the group consisting of hydrocarbons and halogenated hydrocarbons which are capable of dissolving said polycarbonate as it is formed, (3) from about 1.0 to 1.1 mole proportion of phosgene per minute, said introduced top materials having an average total dwell time from about 20 to about 240 seconds in said column, and progressively and simultaneously introducing a catalyst at a point from about 10–60% of the total distance from the bottom of the column to the point of introducing said top materials, whereby said catalyst has an average catalyst dwell time in said column of from about 15 to 150 seconds, the major amount of said catalyst being selected from the group consisting of trialkylamines and hydrohalides thereof, said alkyl radicals containing from 2 to 20 carbon atoms for each alkyl radical, and collecting at the bottom of said column a mixture of an aqueous phase and an organic phase, said organic phase containing said inert organic solvent in which is dissolved the polycarbonate having an inherent viscosity as measured in chloroform as a 0.25% by weight solution at 25° C. of from 0.5 to 4.0.

2. A continuous process as defined by claim 1 wherein said bisphenol is a compound containing from 13 to 40 carbon atoms having the following general formula:

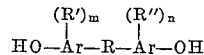

wherein R represents a hydrocarbon radical devoid of olefinic unsaturation containing from 1 to 20 carbon atoms selected from the group consisting of alkylene radicals, alkylidene radicals, and alkyl and aryl substituted alkylene and alkylidene radicals, each Ar represents an aromatic radical of the benzene and naphthalene series containing from 6 to 12 carbon atoms, the hydroxy radicals are attached in one of the meta and para positions relative to R, each of R' and R'' represents a member selected from the group consisting of halogen atoms, hydrogen atoms, alkyl radicals, nitro radicals and alkoxy radicals situated in the available nuclear positions with respect to R and the hydroxy radicals, and each of $n$ and $m$ represents a number of from 1 to 4.

3. A continuous process as defined by claim 2 wherein said bisphenol is at least 50 mole percent 2,2-bis(4-hydroxyphenyl) propane.

4. A continuous process as defined by claim 3 wherein said inert organic solvent is methylene chloride, said hydroxide is sodium hydroxide and said total dwell time is about 50–100 seconds and said catalyst dwell time is about 15–50 seconds.

5. A continuous process as defined by claim 4 wherein said catalyst is triethylamine.

6. A continuous process as defined by claim 4 wherein said catalyst is tributylamine.

7. A continuous process as defined by claim 4 wherein said catalyst is tri-isoamylamine.

8. A continuous process as defined by claim 4 wherein said bisphenol is a mixture of 2,2-bis(4-hydroxyphenyl) propane and 10–50 mole percent of 2,2-bis(3,5-dichloro-4-hydroxyphenyl) propane.

9. A continuous process as defined by claim 8 wherein said catalyst is triethylamine.

10. A continuous process as defined by claim 8 wherein said catalyst is tributylamine.

11. A continuous process as defined by claim 8 wherein said catalyst is tri-iso-amylamine.

References Cited in the file of this patent

UNITED STATES PATENTS

| 2,566,224 | Mackay | Aug. 28, 1951 |
| 2,779,752 | Vining | Jan. 29, 1957 |
| 2,808,420 | Humphlett | Oct. 1, 1957 |

FOREIGN PATENTS

| 546,375 | Belgium | Mar. 23, 1956 |
| 923,192 | Great Britain | Apr. 10, 1963 |

OTHER REFERENCES

Schnell, Angewandt Chemie 68, No. 20, pp. 633–640 (Oct. 21, 1956).